United States Patent
Kongelka

[15] 3,696,899
[45] Oct. 10, 1972

[54] LEAK-PROOF FLUID COUPLING

[72] Inventor: Robert Michael Kongelka, Houston, Pa.

[73] Assignee: Viewlex, Inc.

[22] Filed: Dec. 9, 1970

[21] Appl. No.: 96,367

[52] U.S. Cl. .................................. 192/58 B, 60/54
[51] Int. Cl. .............................................. F16d 35/00
[58] Field of Search......60/54; 192/58 B, 58 A, 58 C, 192/58 R; 277/19, 14 R, 17, 14 V; 415/109; 259/DIG. 16

[56] References Cited

UNITED STATES PATENTS 2,629,472  2/1953  Sterner.....................192/58 A
2,954,857  10/1960  Palm........................192/58 A Primary Examiner—Edgar W. Geoghegan
Attorney—James P. Malone

[57] ABSTRACT

A driving rotor wheel is mounted on a shaft. The shaft and rotor are rotatably mounted in a relatively large hollow housing which comprises the driven part of the coupling. The housing has an annular interior recess into which the periphery of the driving wheel extends. The housing is only partially filled and the fluid drive coupling takes place between the wheel and the housing in the area of the recess. In operation, the fluid is urged by centrifigal force to the recessed area. There is never any fluid at the shaft-housing interface, and, therefore, there is no leakage.

2 Claims, 2 Drawing Figures

PATENTED OCT 10 1972 3,696,899

*INVENTOR.*
ROBERT MICHAEL KONGELKA

LEAK-PROOF FLUID COUPLING

This invention relates to fluid couplings, and more particularly, to fluid coupling means having minimum leakage.

Conventional fluid couplings are generally fully filled with fluid so that fluid is always present at the shaft-housing interface, i.e., the shaft bearing area. The presence of fluid in the shaft bearing area generally causes leakage along the shaft.

The housing in the present invention has a large reservoir which is only partially filled with conventional fluid so that there is never any fluid at the housing-shaft interface regardless of the attitude of the coupling device. The housing has an annular interior recess into which the periphery of the driving wheel extends. The housing is only partially filled and the fluid drive coupling takes place between the wheel and the housing in the area of the recess. In operation, the fluid is urged by centrifugal force to the recessed area. There is never any fluid at the shaft-housing interface and, therefore, there is no leakage.

Accordingly, a principal object of the invention is to provide new and improved fluid coupling means.

Another object of the invention is to provide new and improved fluid coupling means with minimum leakage of fluid.

Another object of the invention is to provide new and improved fluid coupling means with minimum leakage of fluid having a housing with a relatively large reservoir which is only partially filled with fluid so that no fluid is present at the bearing area between the rotor shaft and the housing.

Another object of the invention is to provide new and improved fluid coupling means comprising a wheel-like rotor having a shaft, a housing having an interior reservoir with an annular interior recess, said rotor shaft being rotatably mounted in said housing, the periphery of said rotor extending into said recess, a viscous fluid in said reservoir, the amount of said fluid being such as to partially fill said reservoir when said coupling is at rest, whereby no fluid is present at the interface of said housing and said shaft at any position of said fluid coupling.

These and other objects of the invention will be apparent from the following specification and drawings, of which:

Figure 2:
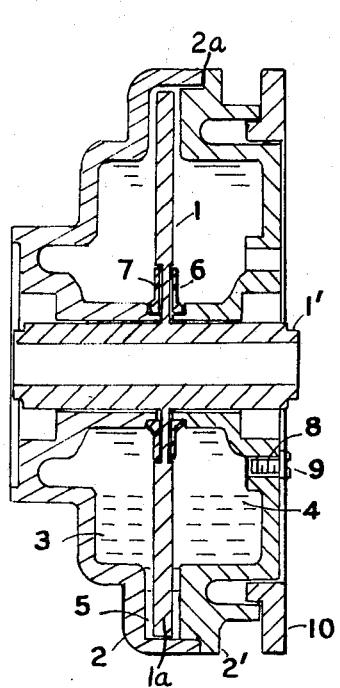
FIG. 2 is a sectional view taken along the lines 2—2 of FIG. 1.
Figure 1:
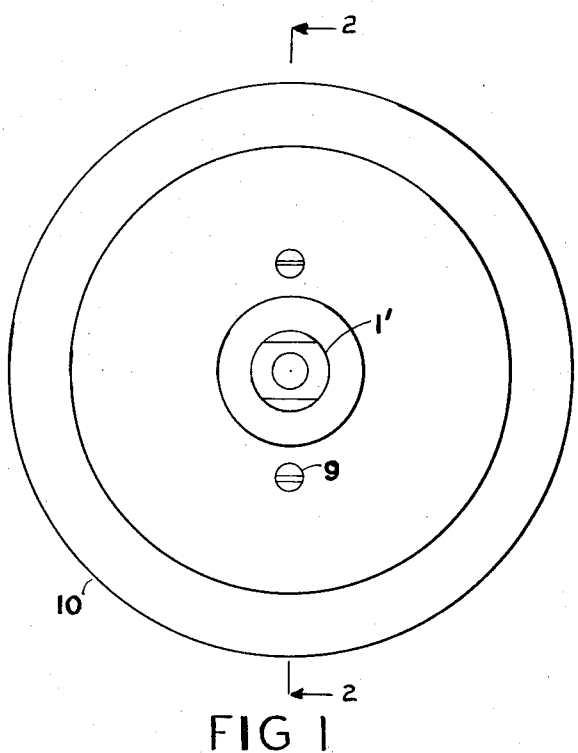
FIG. 1 is a side view of an embodiment of the invention.

Referring to the figures, the invention generally comprises a driving member which is a wheel-like rotor 1, having a fixedly connected shaft 1'.

The base 2 and cover 2' of the housing are sealed, for instance, by plastic cement, along the line 2a which extends around the periphery. The housing has a relatively large reservoir 3 which is partially filled with fluid 4. The housing has an interior annular recess 5 into which the periphery 1a of the rotor 1 extends. The coupling between the driving rotor and the driven housing takes place primarily in the area of the recess since the fluid in the partially filled reservoir is urged in that direction by centrifugal force when the parts are rotating. An output gear 10 is fixedly connected to the housing 2'.

A pair of plastic sealing rings 6 and 7 are mounted on the housing as a splash seal to prevent fluid from coming in contact with the rotor shaft 1'. A filling hole 8 is provided in the housing which is sealed by a screw 9. The rings and housing may be of polycarbonate and the rotor of "Teflon" filled polycarbonate.

FIG. 2 shows a typical level of the fluid 4 when the apparatus is at rest. It is noted that when the parts are rotating, centrifugal force will urge the fluid towards the periphery of the coupling so that the average fluid level will be considerably less than shown in FIG. 2. Therefore, there will be no fluid in the area of the shaft bearing regardless of the position or attitude of the coupling, whether or not the device is operating. When the device is not rotating, fluid drains down to the reservoir as shown in FIG. 2. The reservoir volume exceeds that of the narrow peripheral gaps.

I claim:

1. Fluid coupling means comprising:
   a wheel-like rotor having a shaft,
   a housing having an interior reservoir with an annular interior recess, said rotor shaft being rotatably mounted in said housing,
   the periphery of said rotor extending into said recess,
   a fluid fill hole located substantially below said shaft when said housing is in filling position,
   a viscous fluid in said reservoir, the amount of said fluid being determined by the position of said fill hole so as to partially fill said reservoir when said coupling is at rest, whereby no fluid is present at the interface of said housing and said shaft at any attitude of said fluid coupling, at any time.

2. Apparatus as in claim 1 having a pair of plastic rings connected to said house to seal said reservoir from said shaft, said seals being recessed into said rotor with overlapping by rotor.

* * * * *